United States Patent

Miao

(10) Patent No.: US 9,888,080 B2
(45) Date of Patent: Feb. 6, 2018

(54) DETECTION OF MOBILE PHONE USAGE

(75) Inventor: Alan Miao, Glossop (GB)

(73) Assignee: Trimble Inc., Sunnyvale, CA (US)

( * ) Notice: Subject to any disclaimer, the term of this patent is extended or adjusted under 35 U.S.C. 154(b) by 591 days.

(21) Appl. No.: 12/838,297

(22) Filed: Jul. 16, 2010

(65) Prior Publication Data

US 2012/0015690 A1    Jan. 19, 2012

(51) Int. Cl.
| | |
|---|---|
| *H04L 29/08* | (2006.01) |
| *H04M 1/725* | (2006.01) |
| *H04W 4/00* | (2009.01) |
| *H04W 4/04* | (2009.01) |
| *G01M 17/00* | (2006.01) |
| *B60G 17/0185* | (2006.01) |
| *B60R 22/00* | (2006.01) |
| *H04W 4/02* | (2009.01) |
| *H04W 48/04* | (2009.01) |

(52) U.S. Cl.
CPC ...... *H04L 67/125* (2013.01); *H04M 1/72577* (2013.01); *H04W 4/001* (2013.01); *H04W 4/027* (2013.01); *H04W 4/04* (2013.01); *H04W 4/046* (2013.01); *H04W 4/02* (2013.01); *H04W 48/04* (2013.01)

(58) Field of Classification Search
CPC ......... H04M 1/72527; H04M 1/72522; H04M 1/7253; H04M 1/008; H04M 1/05; H04M 1/6041; H04M 1/6091; H04M 1/6058; H04M 4/00; H04M 4/02; H04M 4/027; H04M 4/04; H04M 4/046; H04M 48/04; H04M 67/125; H04M 1/72577; B60R 11/0241; B60R 22/00; G01R 31/007; G07C 5/008; G01M 17/00; B60G 17/0185

USPC ........................................................ 455/556.1
See application file for complete search history.

(56) References Cited

U.S. PATENT DOCUMENTS 7,065,349 B2 * 6/2006 Nath ....................... G08B 21/06
 455/418
7,505,784 B2    3/2009 Barbera
(Continued)

FOREIGN PATENT DOCUMENTS

| EP | 1929801 | 3/2007 |
|---|---|---|
| WO | WO-2007/040777 | 4/2007 |

(Continued)

OTHER PUBLICATIONS

"Geomanager", *March Trimble MRM*, http://www.trimble.com/mobile_resource_management/geomanager.aspx?dtID= overview,(2010),1 page.

(Continued)

*Primary Examiner* — Huy C Ho
(74) *Attorney, Agent, or Firm* — Kilpatrick Townsend & Stockton LLP

(57) ABSTRACT

Systems, methods and apparatuses for detecting the use of a mobile communications device while driving a vehicle. Data from a vehicle is correlated with data on the use of a mobile communications device to determine if the mobile communications device was used at the same time as the vehicle was in operation. The respective locations of the mobile communications device and vehicle are correlated to determine if the mobile communications device was in the same location as the vehicle.

15 Claims, 4 Drawing Sheets

(56) References Cited

U.S. PATENT DOCUMENTS

| | | | |
|---|---|---|---|
| 8,200,291 B2* | 6/2012 | Steinmetz | H04K 3/415 340/670 |
| 2009/0163243 A1 | 6/2009 | Barbera | |
| 2009/0275281 A1 | 11/2009 | Rosen | |
| 2011/0021234 A1* | 1/2011 | Tibbitts et al. | 455/517 |
| 2011/0237219 A1* | 9/2011 | Mendenhall | H04M 1/72577 455/405 |

FOREIGN PATENT DOCUMENTS

| WO | WO-2011/011544 | 1/2011 |
|---|---|---|
| WO | WO-2011/126747 | 10/2011 |

OTHER PUBLICATIONS

"C-Track Vehicle Tacking", *C-Track Advanced Vehicle Tracking*, http://www.digicore.co.uk/C-TrackingSystem.html,(2010),1 page.

"AVG Overview", *ACCU Test, Engineering Solutions*, http://accutest.co.uk/telematics/accuscan/avg-overview,(2010),3 pages.

"Making Wireless M2M Easy", *ConnectPort X5*, http://www.digi.com/products/wirelessdropinnetworking/gateways/connectportx5.jsp#overview,(2010),1 page.

"Handheld Cell Phone Detector", http://globalgadgetuk.com/detector/htm. (2010),2 pages.

"CellPhone Detector Plus", http://www.cellular.co.za/cellphone_detector_plus,(2010),6 pages.

"SH066P HandHeld Dual Band Cell Phone Jammer", http://...globalgadgetuk.com/personal/htm, (2010),2 pages.

"Portable Mobile Phone Jammer M-10", http://cellular.co.za/accessories/phone_blockers/portable_mobile_phone_jammers_m/htm, (2010),2 pages.

"ZoomSafer", http://www.zoomsafer.com, (2010),2 pages.

* cited by examiner

DETECTION OF MOBILE PHONE USAGE

FIELD OF THE INVENTION

The present invention relates to systems and methods for detecting the use of a mobile communications device and in particular to detecting the use of a mobile communications device by a user while the user is operating a vehicle.

BACKGROUND

Research has shown that using a mobile communications device such as a mobile phone while driving is a significant distraction and substantially increases the risk of the driver crashing.

While there are laws in force in many parts of the world that prohibit drivers from using a mobile communications device while driving, drivers are still flaunting the law by using such mobile communications devices whilst driving. Furthermore in a number of countries companies can be held criminally liable if a driver of their employment were to commit manslaughter as a direct result of using a mobile communications device whilst driving.

So far, there have been no effective means of tracking when a driver is using a mobile communications device while driving. It is an object of embodiments of the invention to address this matter.

SUMMARY OF THE INVENTION

In accordance with at least one embodiment of the invention, methods, devices, systems and software are provided for supporting or implementing functionality to provide the detection of use of a mobile communications device by a user while the user is operating a vehicle, as specified in the independent claims.

This is achieved by a combination of features recited in each independent claim. Accordingly, dependent claims prescribe further detailed implementations of the present invention.

According to a first aspect of the invention there is provided a system for detecting use of a mobile communications device by a user while the user is operating a vehicle, the system comprising: an interface configured to receive first data and second data, wherein the first data is indicative of use of the mobile communications device at a point in time and of a location of the mobile communications device at the point in time, and wherein the second data is indicative of a location of the vehicle at the point in time and an operative state of the vehicle at the point in time; and a processor configured to perform a process to determine that the mobile communications device was used by the user while the user was operating the vehicle, the process comprising: determining that the first data is indicative of the mobile communications device being used; determining that the second data is indicative of the vehicle being operated; and correlating the first data with the second data on the basis of respective location data, whereby to perform said determination that the mobile communications device was used by the user while the user was operating the vehicle.

By correlating the first data with the second data on the basis of respective location data, the likelihood of false positives is reduced. That is, the likelihood of incorrectly determining use of the mobile communications device by a user while the user is operating a vehicle because the phone user was not in the vehicle at the time is reduced.

The second data may comprise data received from a vehicle network via a communications module, the vehicle network connecting a plurality of electronic control units within the vehicle, the plurality of electronic control units being configured to transmit data indicative of the operative state of the vehicle on the vehicle network to the communications module.

The plurality of electronic control units within the vehicle may comprise one or more of: an engine control module; a transmission control module; a brake control module; and an ignition control module, and the plurality of electronic control units may be configured to transmit data comprising one or more of: data indicative of revolutions per minute of an engine of the vehicle; a speed of the vehicle; a position of a brake of the vehicle; and a position of an ignition switch of the vehicle.

By using the data from the vehicle network, the system is able to better determine whether the vehicle was in operation. This includes being able to use a more accurate determination of speed from the cars speedometer over, for example, GPS. In addition, the system is able to detect the operation of the vehicle if it is stationary, but the engine is on (i.e. the engine is idling) as may be the case in a traffic jam or at traffic lights. The system is able to detect if the ignition is on (irrespective of the cars movement), use of a mobile communications device while the ignition is on is illegal in certain countries. Finally, the system can determine whether, for example the parking brake is on, the parking brake being on being indicative that the vehicle is parked, rather than merely being stopped.

The first data may originate from an application running on the mobile communications device, wherein the application running on the mobile communications device is configured to detect at least one operation of the mobile communications device indicative of use of the mobile communications device by a user.

Advantageously, the application running on the mobile communications device is better able to determine the type of use of the mobile communications device, and distinguish between, for example, automated email checking (which requires no driver input) and the user actively reading and/or sending emails. The application is able to report the use of the device in real-time, so that, for example, the driver may be alerted. Finally, the application is able to use the mobile communications device's built in location systems to provide an indication of position of the mobile communications device.

The system may be configured, responsive to a determination that the mobile communications device was used by the user while the user was operating the vehicle, to send a message to the application running on the mobile communications device, the message indicating that the application is to disable at least one operation of the mobile communications device whereby to disable the use of the mobile communications device.

Advantageously, the application is able to target the specific aspects of the use of the mobile communications device, and is therefore able to provide a highly targeted disabling of the mobile communications device, and therefore cause the minimum of disruption while still being able to disable the use of the mobile communications device.

The interface may be configured to send a notification message to the mobile communications device, the notification message indicating that said use of the mobile communications device was disabled on the basis of a determination that the mobile communications device was used by the user while the user was operating the vehicle.

A user of the mobile communications device may be surprised if their use of the mobile communications device is suddenly disabled, and may become distracted (while driving) in an attempt to fix the problem (i.e. by redialing). By providing the message, any doubt is removed, and the user will be encouraged to stop the vehicle before attempting to use the mobile communications device again.

The first data may originate from an intelligent network node associated with a mobile communications network, the mobile communications network providing a network service to the mobile communications device during said use thereof.

The advantages of using a network node to detect use of the mobile communications device is that the use can be reported in real-time by using an intelligent network architecture or similar. In addition, the network's location systems may be used to provide the location of the mobile communications device.

The system may be configured, responsive to a determination that the mobile communications device was used by the user while the user was operating the vehicle, to send a message to the intelligent network node, the message indicating that the mobile communications network is to end said network service whereby to disable the use of the mobile communications device.

This enables the use of the network systems to disable the use of the mobile phone by disabling only those services which have caused the positive determination. For example, a telephone call may be stopped, but the phone may still be allowed to receive text messages.

The interface may be configured to send a notification message to the mobile communications device, the notification message indicating that said use of the mobile communications device was disabled on the basis of a determination that the mobile communications device was used by the user while the user was operating the vehicle.

A user of the mobile communications device may be surprised if their use of the mobile communications device is suddenly disabled, and may become distracted (while driving) in an attempt to fix the problem (i.e. by redialing). By providing the message, any doubt is removed, and the user will be encouraged to stop the vehicle before attempting to use the mobile communications device again.

The system may comprise a memory configured to store data identifying locations with a high risk of accidents, and the system may be configured to adaptively respond to a determination that the mobile communications device was used by the user while the user was operating the vehicle based on a risk of accident determined from the location of the vehicle and the mobile communications device.

By using the location of the mobile communications device in relation to such high risk areas, the system may provide differing responses depending on a measure of risk. In other words, in a high risk scenario, the use of the mobile communications device may be disabled, whereas in a low risk scenario the use of the mobile communications device may simply lead to an alert.

The system may comprise a memory configured to store the first data and the second data, and wherein the stored first and second data is used in historical analysis whereby to determine locations and/or driving patterns indicative of a higher risk of an accident.

This enables a picture of the high risk areas to be assembled.

The interface may be configured, responsive to a determination that the mobile communications device was used by the user while the user was operating the vehicle, to send a signal to an alerting unit within the vehicle whereby to alert the driver of the vehicle.

In some cases, disabling the use of the mobile communications device may be undesirable. By providing an alert to the driver, a more nuanced approach may be taken. Equally, the alert may be provided for an initial period of time before the use of the mobile communications device is disabled as described previously.

The interface may be configured to receive driver identification data, and the processor may be configured to use the driver identification data to associate a mobile communications device with the vehicle whereby to determine that the mobile communications device was used by the user while the user was operating the vehicle.

This enables the system to be used in an arrangement in which there are a plurality of drivers, and/or a plurality of vehicles. By identifying the driver with the vehicle, the correct mobile communications device may be identified for other parts of the system to use.

The processor may be configured to determine if the first data is indicative of the mobile communications device being used, and, if the first determination is positive, to determine if the second data is indicative of the vehicle being operated, and, if the second determination is positive to correlate the first data with the second data on the basis of respective location data.

According to a second aspect of the invention there is provided a system for detecting use of a mobile communications device by a user while the user is operating a vehicle, said vehicle having a plurality of operating states comprising at least engine-on and engine-off, the system comprising: an interface configured to receive first data and second data, wherein the first data is received from a radio receiver located within the vehicle and is indicative of use of the mobile communications device within the vehicle; and wherein the second data comprises data indicative of the operating state of the vehicle received from a vehicle network; and a processor configured to correlate said first and second data, whereby to determine that the mobile communications device was used by the user while the user was operating the vehicle.

By using the data from the vehicle network, the system is able to better determine whether the vehicle was in operation. This includes being able to use a more accurate determination of speed from the cars speedometer over, for example, GPS. In addition, the system is able to detect the operation of the vehicle if it is stationary, but the engine is on (i.e. the engine is idling) as may be the case in a traffic jam or at traffic lights. Finally, the system is able to detect if the ignition is on (irrespective of the cars movement), use of a mobile communications device while the ignition is on is illegal in certain countries.

The second data may be indicative of one or more of: a speed of the vehicle; a position of an ignition switch of the vehicle; a position of a brake of the vehicle; and data indicative of revolutions per minute of an engine of the vehicle.

The interface may be configured, responsive to a determination that the mobile communications device was used by the user while the user was operating the vehicle, to send a signal to an alerting unit located within the vehicle whereby to alert the driver of the vehicle.

According to a third aspect of the invention there is provided a system for detecting use of a mobile communications device by a user while the user is operating a vehicle, said vehicle having a plurality of operating states comprising at least engine-on and engine-off, the system comprising: an interface configured to receive first data and second data, wherein the first data is received from an application running on the mobile communications device and is indicative of the mobile communications device being used, and wherein the second data comprises data indicative of an operative state of the vehicle; and a processor configured to correlate said first and second data, whereby to determine that the mobile communications device was used by the user while the user was operating the vehicle.

By using an application on the device, the system is able to employ real time tracking of the use mobile communications device, that is the application is able to report use as soon as it occurs. The use of an application also allows the mobile communications device to accurately report it position, using location systems (such as GPS or cell triangulation) available to the mobile communications device. Advantageously, the application may also disable the use of the mobile communications device if required.

According to a fourth aspect of the invention there is provided a system for detecting use of a mobile communications device by a user while the user is operating a vehicle, said vehicle having a plurality of operating states comprising at least engine-on and engine-off, the system comprising: an interface configured to receive first data and second data, wherein the first data is received from a node in an intelligent network system within a mobile communicants network and is indicative of the mobile communications device being used, and wherein the second data comprises data indicative of an operative state of the vehicle; and a processor configured to correlate said first and second data, whereby to determine that the mobile communications device was used by the user while the user was operating the vehicle.

The intelligent network system enables real time tracking of the use of the mobile communications device to be provided. In addition the intelligent network systems have access to the location systems used by the network, for example signal triangulation to provide an indication of the position of the mobile communications device.

According to a fifth aspect of the invention there is provided a method for detecting use of a mobile communications device by a user while the user is operating a vehicle, the method comprising: receiving first data and second data, wherein the first data is indicative of use of the mobile communications device at a point in time and of a location of the mobile communications device at the point in time, and wherein the second data is indicative of a location of the vehicle at the point in time and an operative state of the vehicle at the point in time; and determining that the first data is indicative of the mobile communications device being used; determining that the second data is indicative of the vehicle being operated; and correlating the first data with the second data on the basis of respective location data, whereby to perform said determination that the mobile communications device was used by the user while the user was operating the vehicle.

The second data may comprise data received from a vehicle network via a communications module, the vehicle network connecting a plurality of electronic control units within the vehicle, the plurality of electronic control units being configured to transmit data indicative of the operative state of the vehicle on the vehicle network to the communications module, wherein the plurality of electronic control units within the vehicle comprises one or more of: an engine control module; a transmission control module; a brake control module; and an ignition control module, and wherein the plurality of electronic control units are configured to transmit data comprising one or more of: data indicative of revolutions per minute of an engine of the vehicle; a speed of the vehicle; a position of a brake of the vehicle; and a position of an ignition switch of the vehicle.

The first data may originate from an application running on the mobile communications device, the application running on the mobile communications device being configured to detect at least one operation of the mobile communications device indicative of use of the mobile communications device by a user, and the method may comprise sending, responsive to a determination that the mobile communications device was used by the user while the user was operating the vehicle, a message to the application running on the mobile communications device, the message indicating that the application is to disable at least one operation of the mobile communications device whereby to disable the use of the mobile communications device.

The method may comprise sending a notification message to the mobile communications device, the notification message indicating that said use of the mobile communications device was disabled on the basis of a determination that the mobile communications device was used by the user while the user was operating the vehicle.

The first data may originate from an intelligent network node associated with a mobile communications network, the mobile communications network providing a network service to the mobile communications device during said use thereof, and the method may comprise sending, responsive to a determination that the mobile communications device was used by the user while the user was operating the vehicle, a message to the intelligent network node, the message indicating that the mobile communications network is to end said network service whereby to disable the use of the mobile communications device.

The method may comprise sending a notification message to the mobile communications device, the notification message indicating that said use of the mobile communications device was disabled on the basis of a determination that the mobile communications device was used by the user while the user was operating the vehicle.

The method may comprise: storing data identifying locations with a high risk of accidents; and adaptively responding to a determination that the mobile communications device was used by the user while the user was operating the vehicle based on a risk of accident determined from the location of the vehicle and the mobile communications device.

The method may comprise: storing the first data and the second data; and using the stored first and second data in historical analysis whereby to determine locations and/or driving patterns indicative of a higher risk of an accident.

The method may comprise sending, responsive to a determination that the mobile communications device was used by the user while the user was operating the vehicle, a signal to an alerting unit within the vehicle whereby to alert the driver of the vehicle.

The method may comprise: receiving driver identification data; and using the driver identification data to associate a mobile communications device with the vehicle whereby to determine that the mobile communications device was used by the user while the user was operating the vehicle.

The method may comprise: determining if the first data is indicative of the mobile communications device being used; and, if the first determination is positive, determining if the second data is indicative of the vehicle being operated; and, if the second determination is positive, correlating the first data with the second data on the basis of respective location data.

According to a fifth aspect of the invention there is provided a computer readable storage medium storing computer readable instructions thereon for execution on a computing system to implement a method for detecting use of a mobile communications device by a user while the user is operating a vehicle, the method comprising: receiving first data and second data, wherein the first data is indicative of use of the mobile communications device at a point in time and of a location of the mobile communications device at the point in time, and wherein the second data is indicative of a location of the vehicle at the point in time and an operative state of the vehicle at the point in time; and determining that the first data is indicative of the mobile communications device being used; determining that the second data is indicative of the vehicle being operated; and correlating the first data with the second data on the basis of respective location data, whereby to perform said determination that the mobile communications device was used by the user while the user was operating the vehicle.

Further features and advantages of the invention will become apparent from the following description of preferred embodiments of the invention, given by way of example only, which is made with reference to the accompanying drawings.

BRIEF DESCRIPTION OF THE DRAWINGS

A system for detecting the use of a mobile phone by the driver of a vehicle will now be described as an embodiment of the present invention, by way of example only, with reference to the accompanying figures in which.

Several parts and components of the invention appear in more than one Figure; for the sake of clarity the same reference numeral will be used to refer to the same part and component in all of the Figures.

DETAILED DESCRIPTION

Figure 1:
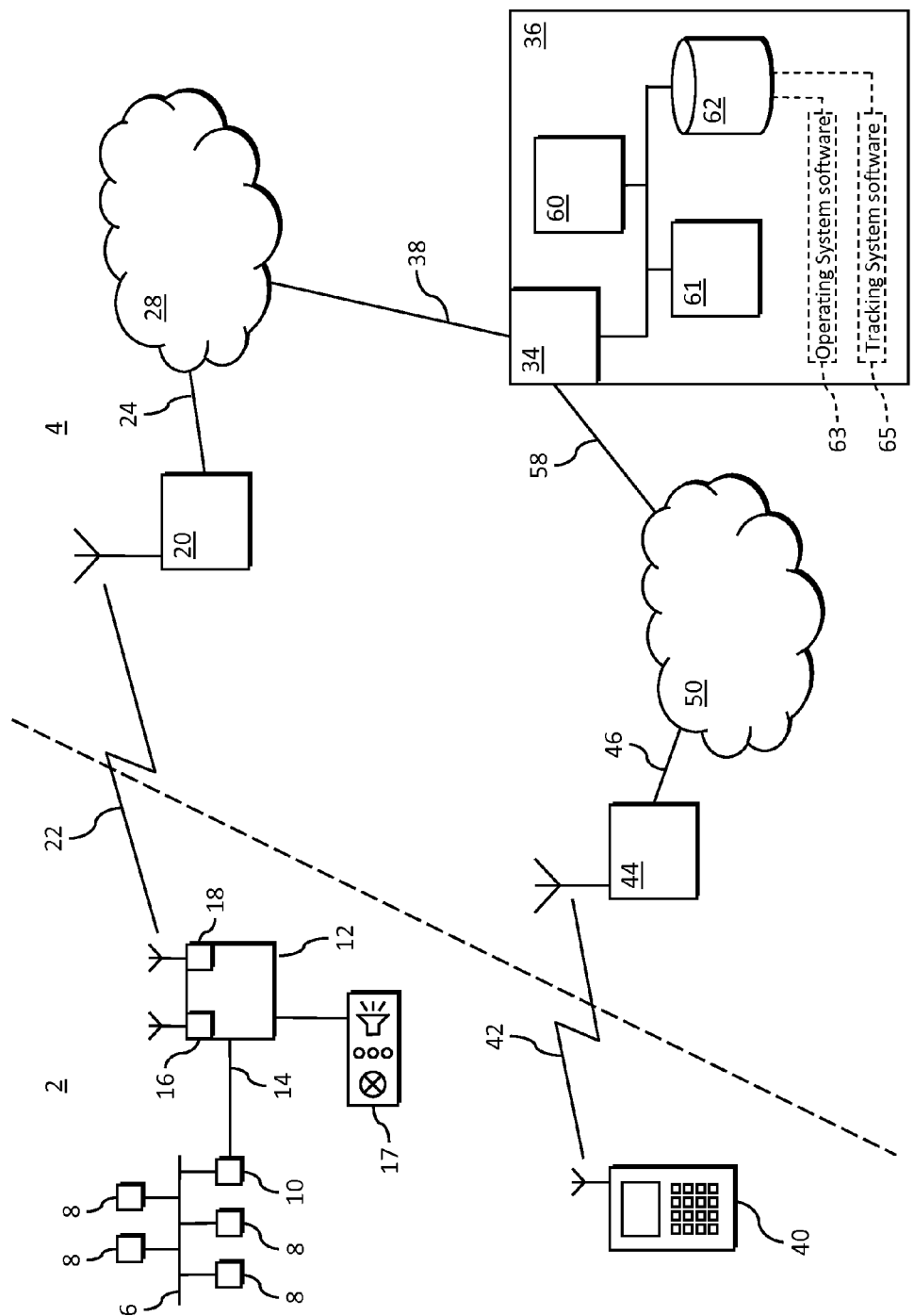
FIG. 1 shows a system for detecting use of a mobile phone while driving in which embodiments of the invention may be realized.

A system in which embodiments of the invention may be realized will now be described with reference to FIG. 1. In particular, shows a system for detecting the use of a mobile communications device such as a mobile telephone or smartphone within a vehicle according. In this system the elements in and around the vehicle are located to the left of the dashed line, and are notated by the reference 2. Elements which are not within the vehicle, are to the right of the dashed line, and are notated by the reference 4.

Only one vehicle 2 and mobile communications device 40 are illustrated for clarity, however it will be apparent that embodiments of the invention are intended for use with systems comprising many vehicles and many mobile communications devices.

Within the vehicle is vehicle network or vehicle bus such as a Controller Area Network (CAN or CAN-bus) 6 which is well known in the art. The CAN 6 connects a number of Electronic Control Units (ECUs) 8 which may include an engine control unit, transmission control unit, anti-locking braking system, ignition control unit and the like. The CAN enables these units to communicate with each other to share data such as the speed of the engine, the speed of the car, the state (i.e. position) of the ignition switch and/or the position of the parking brake.

Connected to the CAN 6 is an On Board Diagnostics (OBD) port 10. Conventionally, the OBD port is used to connect a laptop or similar device, and allows the laptop to communicate over the CAN 6 with the ECUs 8 in the vehicle.

A telematics unit 12 is connected to the OBD port 10 through connection 14. The telematics unit may be provided with a communications module (not shown) to provide the connection 14 to the OBD port 10. The telematics unit 12 is able to communicate with the ECUs 8 on the CAN 6 via the connection 14 and OBD port 10. The telematics unit 12 is able to listen to messages broadcast on the CAN 6, or request information from a specific ECU 8.

The telematics unit 12 comprises a Global Positioning System (GPS) unit 16. GPS is well known in the art and will not be described in detail here. The GPS unit 16 is able to provide location, velocity and/or time information to the telematics unit 12.

The telematics unit is connected to a user interface unit 17. The user interface unit may be mounted on the dashboard of the vehicle. The user interface unit 17 may comprise an alerting unit, such as a light, LED or buzzer for alerting a driver of the vehicle. The user interface unit 17 may also comprise an identification unit to allow the drivers of the vehicle to identify themselves. This identification unit may be a keypad, or an identity reader such as a contact fob reader or RFID reader. Separate user interface units may be provided, and the schematic representation of a single user interface unit 17 should not be taken as limiting.

The telematics unit also comprises a wireless unit 18 which communicates with base station 20 via wireless connection 22. The wireless connection 22 may comprise a mobile communications connection such as a GSM or UMTS (3G) link. The communications between the wireless unit 18 and the base station 20 may be transmitted using a packet data protocol such as GPRS, EDGE or UMTS. Accordingly, the wireless unit 18 may be a mobile transceiver such as that found in a mobile telephone or smartphone. The base station 20 may be a base transceiver station (BTS) or node B as defined in the GSM and 3G standards respectively. The base station 20 is connected to mobile communications network 28 via a connection 24. The connections within a mobile communications network, and from a mobile communications network to other networks and devices are well known in the art and will not be described in detail.

Mobile communications network 28 is connected to an interface 34 of a tracking server 36 via communications channel 38. The tracking server 36 may be a fixed computer or server, or a mobile station. Equally the communications channel 38 may comprise a wired or wireless connection.

A mobile communications device, such as a mobile telephone, smartphone or PDA 40 is shown in FIG. 1 within the vehicle 2. The mobile communications device 40 has a communications channel 42 with a base station 44 which may be a BTS or Node B as described above in relation to base station 20. The base station 44 has a connection 46 to a mobile communications network 50. The mobile communications network 50 provides a service to the mobile communications device 40. This service may, include a telephone call. In addition the mobile communications network 50 is connected to the interface 34 of the tracking server 36 via communications channel 58.

While mobile communications networks 28 and 50 are shown as being distinct, it will be apparent that they may be the same network, or substantially overlap. Base stations 20 and 44 may be the same physical unit, and provide the connectivity for the telematics unit 12 and to the mobile communications device 40. Moreover, the overall connections between the tracking server 36 and the telematics unit 12 and mobile communications device 40 respectively may be routed via other networks, which are not shown.

Tracking servers, such as tracking server 36 are well known in the art and can be used for fleet management. The functionality of a tracking server may be distributed over a server system (using for example cloud architecture), or may be implemented in a single machine. A tracking server can provide a user, such as a fleet manager, with telematics data relating to a fleet of vehicles all fitted with telematics units such as telematics unit 12.

The tracking server 36 has an interface 34 for communicating with mobile communications networks 28 and 50. The interface may be a wired or wireless network connection such as Ethernet, Wifi or mobile communications (i.e. 3G). A processor 60, memory (i.e. RAM) 61 and a hard disk 62 are illustrated and are connected together. The hard disk 62 may store software (that is computer programs) which may be run on processor 60. This software may include operating system software 63 and/or tracking system software 65.

It will be apparent that such features are merely exemplary and that the tracking server will have many other features which are well known in the art for a computer or server. The server may be connected to user interface devices such as a monitor, keyboard and mouse to enable interaction with, for example, a fleet manager.

A method for detecting use of a mobile phone while driving according to one embodiment of the invention will now be described with reference to FIG. 2. The method may be used within the system described with reference to FIG. 1. In embodiments of the invention, this method may be, in part, provided by the tracking system software running in the tracking server 36.

In step S1 the telematics unit 12 receives data from the ECUs 8 via the CAN 6 and OBD port 10. The telematics unit 12 may request the data, that is send a request to the ECUs 8 and receive a response. Alternatively the telematics unit 12 may listen in on the network traffic in CAN 6 to receive data. In addition, the GPS unit 16 provides location information to the telematics unit 12. The GPS may also provide time information and/or speed information.

The telematics unit can process the data received from the CAN 6 and the GPS unit 16. This processing may involve discarding or combining some of the received data. In addition, the data may be compressed. The data generated will henceforth be described as telematics data. The telematics unit 12 may periodically generate telematics data, for example every 10 seconds or every 5 minutes. The preference of when to provide this data may be determined by the system operator. An adaptive algorithm may be used to send the data in a non-periodic fashion, i.e. the transmission of data may only occur when the vehicle is moving. Alternatively, the data may be requested by the tracking server 36. The additional dashed lines are indicative of the (optional) repeated generation of the telematics data.

The telematics data includes the location of the vehicle, a timestamp corresponding to the data, and information indicative of the operative state of the vehicle. The telematics data may also include other data such as the identity of the telematics unit 12. The data indicative of the operation of the vehicle may take many forms, these forms will be described in more detail later when the use of the telematics data is described. The data may include information on the speed of the vehicle, the speed of the engine (i.e. revolutions per minute or RPM), information on the position of the ignition switch and/or information on the position of the parking brake.

In step S2 the telematics data is transmitted by the telematics unit 12 to the tracking server 36. Again the additional dashed lines are indicative of the (optional) repeated generation of the telematics data.

In step S3 the tracking server stores the received telematics data in hard drive 62.

In step S4 use of the mobile communications device 40 is detected. There are various methods by which this may be done, and these will be described in more detail below.

In step S5, in response to this detection, a message is sent to the interface unit 34 of the tracking server 36. This message provides an indication that the use of the mobile communications device 40 has been detected. In addition the message includes data identifying a timestamp indicating when the use occurred, the location of the mobile communications device 40 when the use occurred, and an identification of the mobile communications device.

The data can also include: the duration of the use and/or the type of use (for example, packet data access or voice call). The location of the mobile communications device 40 can be derived using a number of techniques which are well known in the art. These will be described in more detail below.

In step S6 the data indicating use of the mobile communications device, along with time and location (henceforth 'use data') is retrieved from the message by the tracking server 36. This data from the message may be stored in memory 62.

The processor 60 then determines whether the mobile communication device 40 was used while the vehicle was in operation.

In step S7 the processor 60 uses an association between the mobile communications device 40 and the telematics unit 12 to link the use data (indicating the use of the mobile communications device 40) to the telematics data from the associated telematics unit 12. The processor 60 then uses the timestamp from the use data to identify the telematics data with a corresponding timestamp. It will be understood that the timestamps may not exactly correlate, and consequently the data having the nearest timestamp may be used. Alternatively, any other method, such as interpolation, may be used to derive approximate telematics data from the stored telematics data.

In step S8 the processor 60 then analyzes the telematics data to determine if the vehicle was in operation when the mobile communications device 40 was being used. The detection of the vehicle being in operation may take a number of forms and will be expanded on below, however this may include determining if the vehicle is moving, or whether the engine of the vehicle is on or off.

If it is determined that the vehicle was in operation when the mobile communications device 40 was being used, then the method proceeds to steps S9, otherwise, the method returns to the beginning.

In step S9, having determined that the vehicle was in operation at the same times as the mobile communications device 40 was being used, the processor then correlates the location of the vehicle with the location of the mobile communications device. The correlation determines whether the vehicle and the mobile communications device 40 were in the same position when the use of the mobile communications device 40 occurred. By correlating the locations indicated in the telematics data and in the use data, the system is able to reduce the instances of false positives, that is, a false determination of use of a mobile communications device while driving. These false positives may occur if the mobile communications device associated with the vehicle is used by someone other than the driver of the vehicle. Equally the vehicle may be being driven by someone other than the normal driver (the normal driver's mobile communications device being associated with the vehicle).

If the positions do not correlate, then method returns to the beginning.

However, if the positions do correlate, then the method may proceed to any, some, or all of steps S10, S11, S13 or S14.

In step S10, the tracking server 36 may send an instruction message to the telematics unit 12. Upon receipt of the instruction message, the telematics unit 12 may provide an alert to the driver of the vehicle. The alert may be provided through the alerting unit of the user interface unit 17, such as by flashing the light or LED or sounding the buzzer.

In step S11, the tracking server 36 may request that the use of the mobile communications device 40 is disabled, for example by ending an ongoing telephone call. The methods by which this may be done will be described in more detail below in relation to the detection of the use of the mobile communications device 40.

Having requested the disabling of the use of the mobile communications device, in step S12 the tracking server 36 may send a message to the mobile communications device 40 (for example a text message) to inform the user that the use of the mobile communications device was disabled due to it being determined that the use of the mobile communications device was made while driving.

A user of the mobile communications device may be surprised if their use of the mobile communications device is suddenly disabled, and may become distracted (while driving) in an attempt to fix the problem (i.e. by redialing). By providing the message, any doubt is removed, and the user will be encouraged to stop the vehicle before attempting to use the mobile communications device again.

In step S13 the tracking server 36 may store in hard drive 62 that the use of the mobile communications device by a user while the user is driving a vehicle has been detected. This record may be stored in hard drive 62 along with other telematics data received from the telematics unit 12. The stored record may be used at a later date by, for example, a fleet manager to manage the driver of the vehicle.

In step S14, the tracking server 36 may also provide an alert to a user such as the fleet manager. This may be through the user interface of the tracking server 36.

The detection of operation of the vehicle may be made in a number of ways. One is to use data received by the telematics unit 12 from one or more ECUs 8 through the OBD port 10. Alternatively, position and/or velocity data received from the GPS unit 16 may be used.

This received data may include an indication of the speed of the vehicle, either from the GPS unit 16 of received from the CAN 6. The data on the speed of the vehicle may be compared against a threshold, a speed above which may be used as an indication that the vehicle is in operation. The threshold may, for example, be set at, or just below, the urban speed limit of the country in which the system operates. For example, in the United Kingdom the threshold may be set at 30 mph (the urban speed limit) or 25 mph (just below the urban speed limit). Alternatively, the threshold may be set below this, for example 10 mph or 20 mph. The threshold may alternatively be set at zero, that is, if the vehicle is moving it is deemed to be in operation.

When using speed to determine the operation of the vehicle, it is advantageous to use a speed indicator from an ECU on the vehicle network, for example from the engine ECU or a transmission ECU. This is because the speed indicated by these ECUs is more accurate and more consistent than, for example, speed derived from a GPS. In particular, GPS reception may be adversely affected by, for example, building and tunnels which block the GPS positioning signals. This blocking may lead to a loss of position fix (so that the speed cannot be known) or large inaccuracies (leading to inaccurate speed indications).

The received data may include an indication of the position of the ignition switch, wherein if the ignition switch is on, the vehicle is determined to be in operation. In certain countries, it is a legal requirement that the ignition be switched off (if use of a mobile communications device by a driver is to be allowed). Therefore, it is advantageous to use data indicative of the position of the ignition switch of the vehicle since the tracking server can deduce if the legal requirements are met.

The received data may include information on the state of the engine. This information may simply indicate one of an engine on, or engine off state, with the engine on state being indicative of the vehicle being in operation. Alternatively the rotational speed of the engine (that is in indication of the revolutions per minute or RPM) may be compared to a threshold to determine operation of the vehicle. The threshold may be zero, set at the idling speed of the engine, or at any other value. The advantages of using engine data as opposed to speed (for example from a GPS unit) is that the system is able to detect if a stationary vehicle (for example one in a traffic jam) is in operation. Again, it may be a legal requirement that the engine is turned off for use of a mobile communications device to be legal.

The received data may include an indication of whether the vehicle is in gear, and/or what gear the vehicle is in. If the vehicle is in gear, that is, not in neutral, the vehicle may be determined to be in operation.

The received data may include an indication of whether the parking brake is applied. With the vehicle being determined to be in operation if the parking brake is off (i.e. not applied). The advantages of using such metrics is that a more complete picture of the operative state of the vehicle can be deduced by the tracking server, enabling the system to better detect use of a mobile communications device while driving.

The above examples are purely illustrative, and other types of data from the telematics unit 12 may be used to determine the operation of the vehicle. Alternatively or additionally, more than one of the above indications of the vehicle being in operation may be used in combination to determine if the vehicle is in operation.

The location of the telematics unit 12 may be provided by the GPS unit 16, or by the wireless unit 18. In addition, accelerometers and/or gyroscopes within the telematics unit may be used to interpolate a position between two position fixes. The wireless unit 18 may provide an indication of position using a cell-ID, or by triangulation of signals received from a mobile communications network. The wireless unit 18 may request an indication of location from the mobile communications network, this may be provided by triangulating signals sent by the wireless unit 18 and received by multiple base stations.

Equally the location of the mobile communications device 40 may be provided by a GPS unit built into the mobile communications device, or by cell-ID or triangulation of signals sent to and/or received from the mobile communications network.

To correlate the position of the mobile communications device and the vehicle, the tracking server 36 is required to compare the locations indicated in the telematics data and the use data and determine whether they co-locate.

This may involve mapping one form of location data (such as a cell-ID) to another (such as geographic location). Both the location indicated in the telematics data and the location indicated in the use data may have a degree of error or uncertainty. In addition, the location information may define a specific areas, rather than a point with an error radius (this may occur if a cell-ID is used, and the cell is provided by a directional base station and thus covers a sector of a circle as opposed to a full circle).

To determine the correlation of location the processor 60 may compare the indicated locations of the mobile communications device and of the vehicle and calculate a probability that the mobile communications device was located in the vehicle based on the degree of error. Alternatively, the processor 60 may derive a location area from each indicated location, and test for whether the areas overlap. Other methods of correlating the locations of the mobile communications station and the vehicle will be apparent to the skilled person.

The processor 60 may determine the correlation of location in terms of a range of probabilities, or as a definite, positive or negative, determination.

As mentioned above, there is an association between the mobile communications device 40 and the telematics unit 12.

One method of providing the association is to identify the driver of the vehicle, and then to lookup an identity of a mobile communications device which is known to be used by the driver so as to associate that mobile communications device with the vehicle. The identifying of the driver may be done in a number of ways. For example, the user interface 17 may be used to identify the driver of the vehicle when the driver begins to use the vehicle. This may be done by, for example, having the driver key in an identification code or pin, swipe an RFID device against the user interface or use a contact fob with an appropriate receiver in the user interface unit 17. The identity of the driver may then be stored in the telematics unit 12, and/or may be transmitted to the tracking server 36. The tracking server may store a database of known mobile communications devices and their users. The identity of the driver may be looked up in this database to provide the identity of the mobile communications device.

The identity of the driver does not have to be provided to the telematics unit for the association to be formed. For example it may be known that only one driver drives a particular vehicle, and therefore the driver's mobile communications device may be associated with the vehicle when the system is set up. Equally, when a driver is assigned a vehicle, the association between the driver's mobile communications device and the vehicle may be derived and stored.

The identity of the mobile communications device may be directly provided to the system, without the driver being identified as such. For example, the mobile communications device may comprise an RFID which may be swiped against the user interface unit 17 when the driver starts to use the vehicle. This RFID within the mobile communications device may provide the identity of the mobile communications device.

In all cases, the association between a mobile communications device and a vehicle identifies that the vehicle is being used by a person who is also using/known to use the mobile communications device.

As mentioned above, there are a number of methods by which the use of the mobile communications device may be detected. Equally there are a number of ways the use of the mobile communications device can be stopped.

For example, a network node within the mobile communications network 50 may be configured to detect the use of the mobile communications device 40. Upon detection of use of the mobile communications device 40 the network node sends a message to the tracking server 36. Equally, the tracking server 36 may send a message to the network node requesting that the use of the mobile communications device 40 is to be disabled. In response to this message the network node may cause the mobile communications network to disable some or all of the services (such as the ongoing call) that are being provided to the mobile communications device by the mobile communications network.

One technique for realizing the mobile communications network side use detection, is by means of an Intelligent Network (IN) system within a mobile communications network. Within the IN system there is provided a Service Switching Point (SSP) which may be co-located with a Mobile Switching Centre (MSC) of the mobile communications network. The SSP performs basic call processing and provides trigger and event detection points for IN processing. The event detection occurs at, for example, a transition between states such as off-hook, dialing, answer, no answer, busy, hang up etc. . . .

At the event detection points, the SSP may invoke a query to an SCP. As known in the art, the query is a request for further instructions on how to proceed. The Service Control Point (SCP) contains logic which implements the desired behaviour i.e., the services. The SCP may send a message to the SSP with instructions on how to proceed.

The tracking server 36 may send a message to the SCP requesting that certain services be created performed for one or more mobile communications device, so that the mobile communications device 40 is registered with the SCP. This request may be made on a fleet basis, that is, all drivers of a fleet may have their mobile communications device registered during setup. Alternatively, the identity of the mobile communications device may be derived from the drivers identifying themselves or their mobile communications devices to the telematics unit 12 as described above, the mobile communications devices being registered upon this identification.

The service may be defined by certain detection points. Detection points trigger events when certain points in a service provided by the mobile communications network are reached. For example when a call is dialed from the mobile communications device, or when an incoming call is answered by the mobile communications device, the IN system may send a message to the tracking server. This will enable the tracking server to detect the use of the mobile communications device. The message may identify the mobile communications device, the time at which the detection point was triggered, the type of detection point and the location of the mobile communications device.

Equally, the tracking server may further request that, upon hang-up or upon another call ending detection point, the IN system sends a further message to the tracking server so that the duration of the call may be known.

The tracking server may send a request to the IN system requesting that the call be stopped. If this occurs, the SCP may send a message to the SSP/MSC causing the call to be stopped.

The IN system may be set up to preemptively block a call to the mobile communications device while a driver is moving. For example, at call starting detection point (e.g. incoming call, or dialing) the SCP may query the tracking server. If the vehicle is determined to be in operation (and optionally if the locations of the vehicle and mobile communications device correlate) then the tracking server may respond requesting that the call is not started, that is the incoming call is diverted to, for example, voicemail, or an outgoing call will not be connected.

While the above description of the IN system has been described in relation to a telephone call, it will be equally apparent that the technique is applicable to other types of use of the mobile communications device.

The advantages of using a network node to detect use of the mobile communications device is that the use can be reported in real-time, for example by using an intelligent network architecture or similar. This enables the pre-emptive blocking of mobile communications device use, such as described above. In addition, the network's location systems may be used to provide the location of the mobile communications device.

A node within the mobile communications network may create records of the use of the mobile communications device 40. For example an MSC within the mobile communications network may create a Call Data Record (CDR) which details the use of the mobile communications device. The CDRs are provided to the accounting and billing system of the mobile communications network. The CDRs may be sent to the tracking server upon creation, alternatively the tracking server 36 may periodically request these records from the mobile communications network. The tracking server 36 may then use the CDRs to determine the use of the mobile communications device 40.

The mobile communications device 40 may be provided with a monitoring application such as hardware and/or software which is designed to run in/on the mobile communications device 40 itself and to detect the use of the mobile communications device 40 by a user. This monitoring application may be commercially available spyware.

The monitoring application may detect the use of the mobile communications device by detecting operations performed by the mobile communications device indicative of use by a user. For example, the monitoring application may detect user interaction with a further application running on the mobile communications device. It will be realized that application here is referring to any combination of software and hardware which provides functionality. For example, a telephone application may provide the user with the telephone functionality of the mobile communications device. Alternatively the monitoring application may detect the operation of the mobile communications device's transceiver, that is, that the mobile communications device is transmitting or receiving signals.

Upon detection of the use of the mobile communications device 40, the monitoring application may send a message to the tracking server 36. The message may be an email or SMS message.

If such a monitoring application is used on the mobile communications device then the tracking server may send the monitoring application a message indicating that the use of the mobile communications device is to be disabled. Upon receipt of such a message, the monitoring system may disable the use of the mobile communications device by, for example, signalling the telephone application to disable or stop the call, by disabling the telephone application itself (i.e. exiting it), or disabling the transceiver for a time period (such as for 30 seconds or a minute). The monitoring application may further provide a message to inform the user the use of the mobile communications device was disabled due to the positive determination of use while driving.

The advantages of using an application are that the application running on the mobile communications device is better able to determine the type of use of the mobile communications device, and distinguish between, for example, automated email checking (which requires no driver input) and the user actively reading and/or sending emails. The application is able to report the use of the device in real-time, so that, for example, the driver may be alerted. Finally, the application is able to use the mobile communications device's built in location systems to provide an indication of position of the mobile communications device. Moreover the application is able to target the specific aspects of the use of the mobile communications device, and is therefore able to provide a highly targeted disabling of the mobile communications device, and therefore cause the minimum of disruption while still being able to disable the use of the mobile communications device.

An alternative embodiment of the invention will now be described with reference to FIG. 3.

In line with FIG. 1, CAN 6 links ECUs 8. OBD port 10 connects the CAN 6 with telematics unit 12 via connection 14. A communications module 64 within the telematics unit is shown with which sends and receives the data to/from the OBD port 10 over connection 14.

The communications module 64, connected to the CAN, provides data to a processor 66. The processor is connected to a memory 68 which may store information provided by the processor 66. The memory 68 may also store computer programs, such as the telematics unit software 67, which are run on the processor to provide the desired functionality of the telematics unit 12.

The telematics unit 12 is provided with a GPS unit 16, which is connected to the processor 66 to provide the processor 66 with GPS data such as position, speed and time.

A wireless unit 18 is provided and is connected to the processor. This wireless unit is connected to a base station 20 via a wireless connection 22. As described in more detail with reference to FIG. 1, the wireless unit 18 is able to wirelessly communicate with a mobile communications network (not shown) via base station 20. A tracking server, such as shown in FIG. 1 may be connected the telematics unit 12 via this mobile communications network.

User interface unit 17 is connected to the telematics unit 12. The user interface unit may be as described above in relation to FIG. 1 and comprise an alerting unit and/or an identification unit. A communications module 70, within the telematics unit 12 connects the processor 66 to the interface unit 17.

A mobile communications device 40 is shown. The mobile communications device 40 has a wireless connection 42 to a base station 44. As described above in relation to FIG. 1, the mobile communications device 40 may communicate with the base station 44 to transfer data, such as making and receiving a telephone call. The base station 44 is connected to a mobile communications network (not shown).

The telematics unit 12 is provided with a radio receiver, or signal detector, 72 connected to the processor 66. The radio receiver 72 is connected to an aerial located within the vehicle and is designed to receive and detect the signals transmitted by a mobile communications device. The aerial may comprise a directional antenna so that only the signals transmitted by a mobile communications device held by a driver of the vehicle are detected. The radio receiver 72 may also be designed to pick up signals over a certain power, that is, signals transmitted by a transmitter within the vehicle. The radio receiver 72 may selectively detect signals within certain frequency bands, that is, those frequency bands used by mobile communications device devices. These frequency bands include the 850 MHz, 900 MHz, 1900 MHz and 1900 MHz bands used for GSM networks, and the 2100 MHz band used for 3G networks. Radio receivers like this are known in the art and will not be described in more detail.

The connection 42' schematically displays the signal from the mobile communications device 40 being received and detected at the radio receiver 72.

The telematics unit 12 is further provided with a transmitter 74 which transmits a localized jamming signal to block, disrupt, or otherwise prevent wireless communications by the communications device 40 within the vehicle. The transmitter 74 transmits a low power, localized, signal which disrupts the signals transmitted by and received from the mobile communications device 40, with minimal effect on mobile communications devices outside the vehicle.

A method for detecting use of a mobile phone while driving according to one embodiment of the invention will now be described with reference to FIG. 4. The method may be used within the system described with reference to FIG. 3. In embodiments of the invention, this method may be, in part, provided by the telematics unit software running in the telematics unit 12.

In step T1 a determination is made as to whether the mobile communications device 40 is being used. If the mobile communications device is being used, its use, in the form of signals sent from the device, will be detected by radio receiver 72. The radio receiver 72 will report the positive determination of mobile communications device use to the processor 66. The self looping decision block T1 represents the method awaiting such a determination. When it is determined that the mobile communications device is in use, the method proceeds to step T2. This loop may be replaced by, for example, the radio receiver 72 sending an interrupt message to the processor, which initiates the method.

In step T2 it is determined whether the vehicle is in operation. The ways in which vehicle operation may be detected have been described in detail with reference to FIGS. 1 and 2, and will not be repeated here.

If it is determined that the vehicle is not in operation, then the method returns to step T1. If it is determined that the vehicle is in operation the method proceeds to step T3.

In step T3, a timer is started. The timer is used to distinguish use of the mobile communications device by a user, in contrast to, for example, basic network signalling traffic which will last a short period of time. The period for which the timer counts down can be set by, for example a fleet manager, or may be preset in a factory. A values for the timer may be 3 or 5 seconds, however longer periods, such as 10 seconds and shorter (1 second or less) may be used.

In step T4 a check is performed to determine if the vehicle is still in operation. If the vehicle is no longer in operation, then the method returns to step T1. If the vehicle is still in operation, the method continues to step T5

Similarly, in step T5 a check is performed to determine if the mobile communications device is still in use. If the mobile communications device is no longer in use, the method returns to step T1. If the mobile communications device is still in use the method continues to step T6.

In step T6, a check is made to determine if the timer has expired. If the time has not expired, the method returns to steps T4. However if the timer has expired, the method continues to steps T7, T8, T9 and T10.

The effect of steps T4, T5 and T6 is to check for continuous use of the mobile communications device and simultaneously continuous operation of the vehicle for a period defined by the timer. If during the timer period, the phone use stops or the vehicle operation stops, the method returns to the beginning. If the mobile communications device is used continuously, and if the vehicle is in operation continuously during the period does the method proceed to steps T7, T8, T9 and T10.

A positive determination of use of a mobile communications device by a user while the user is operating a vehicle has been made if the method proceeds to steps T7, T8, T9 and T10.

In step T7 the driver of the vehicle is alerted to the detection of use of the mobile communications device while driving. This may be done using the user interface 17. The user interface 17 is able to alert the driver of the vehicle to the positive determination using any of the methods described above in relation to FIGS. 1 and 2.

In steps T8 the use of the mobile communications device may be jammed using the transmitter 74. The transmitter 74, when activated by the processor, may transmit a localized jamming signal within the vehicle. The jamming signal may be limited to the frequencies used by mobile communications devices and interrupts and masks the signals received by the mobile communications device.

In step T9 the telematics unit 12 may store an indication in the memory 68 that the use of the mobile communications device while driving was detected. The stored indication may be later uploaded to a tracking server.

Finally in step T10 the telematics unit 12 may report the detection of the use of the mobile communications device while driving to, for example, a tracking server using wireless unit 18 and wireless connection 22. This report may be included with other telematics data, such as the operative state of the vehicle, position, speed, time etc. . . .

Additional Details and Modifications

Figure 3:
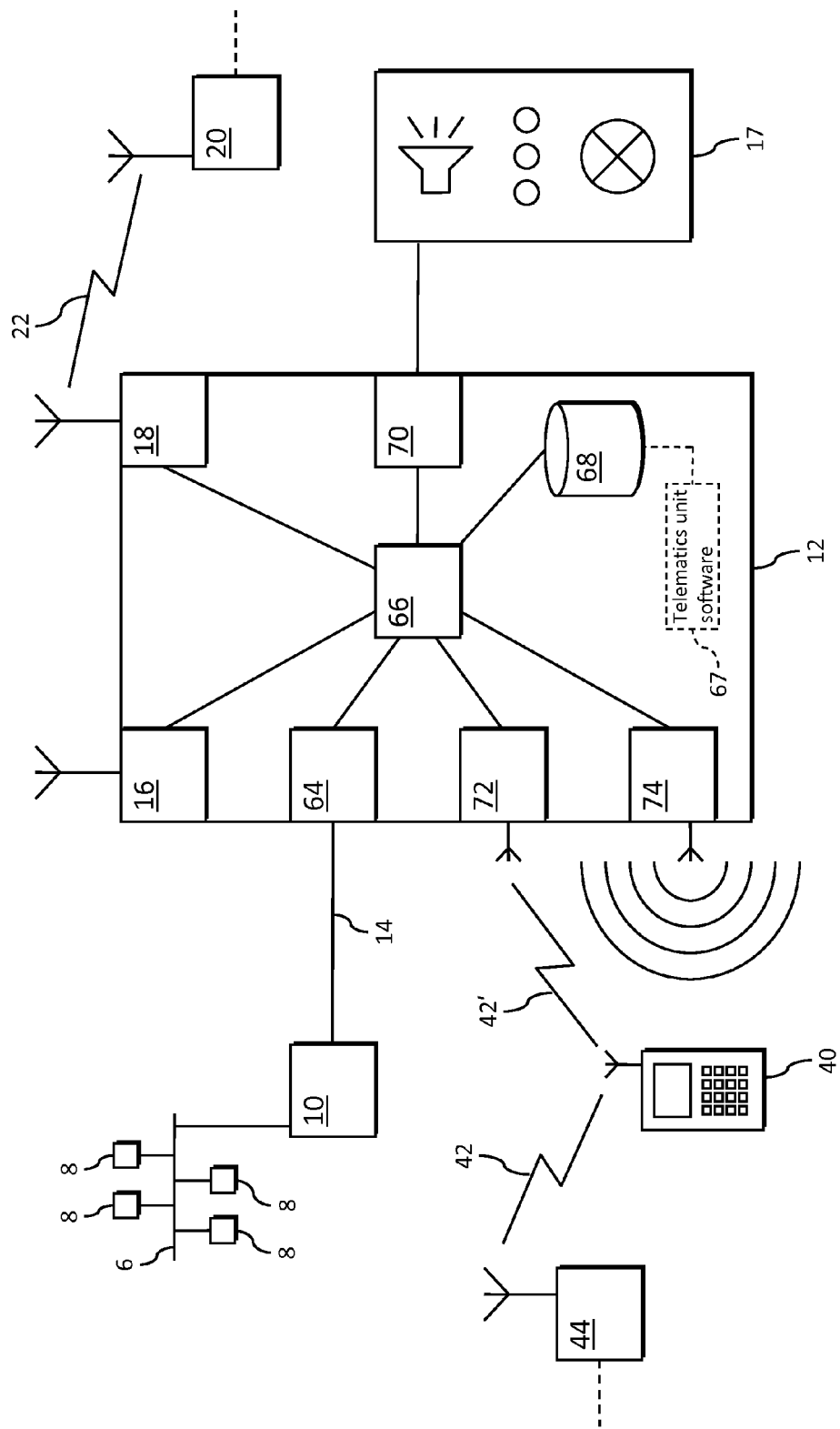
FIG. 3 shows a system for detecting use of a mobile phone while driving in which embodiments of the invention may be realized.
Figure 4:
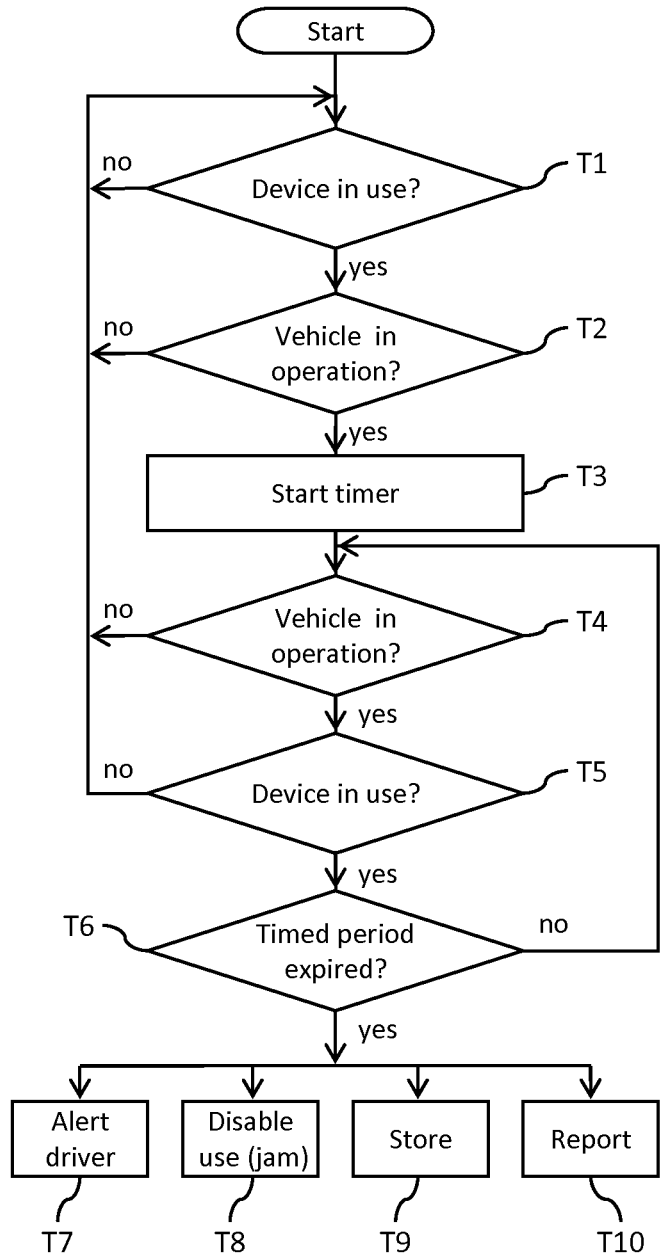
FIG. 4 shows a method for detecting use of a mobile phone while driving in the system of FIG. 3 according to an embodiment of the invention.

In the embodiment described in relation to FIGS. 3 and 4, the telematics unit is provided with wireless unit 18, which may transmit telematics data to a tracking server. The transmission of the telematics data may cause a false detection of mobile communications device use by the radio receiver 72. To overcome this problem the telematics unit 12 may be arranged to switch off the radio receiver 72 while the wireless unit 18 is transmitting. Alternatively, the telematics unit 12 may be arranged to disregard any indications of mobile communications device usage from the radio receiver 72 while the wireless unit 18 is transmitting. The telematics unit 12 may know what frequency band the wireless unit 18 is transmitting on, and therefore the radio receiver 72 may continue to detect signals on the frequency bands which are not being used by the transmitter 18.

In the embodiment described in relation to FIGS. 3 and 4, the use of the mobile communications device is detected by means of a radio receiver 72. However alternative systems of detecting use may be used. For example the vehicle may be provided with a cradle for the mobile communications device. The cradle may charge the mobile communications device. The processor may be arranged to detect if the mobile communications device is removed from the cradle, and use this as an indication of use of the mobile communications device.

The test for continuous use in FIG. 4 may replaced by a method in which, upon detection of concurrent vehicle operation and mobile communications device use, the telematics unit starts a timer, and at the end of the timer period, checks for mobile communications device use and vehicle operation is made. If both checks show that the vehicle is still in operation and that the mobile communications device is still in use, then the telematics unit 12 may proceed to steps T7, T8, T9 and/or T10.

Figure 2:
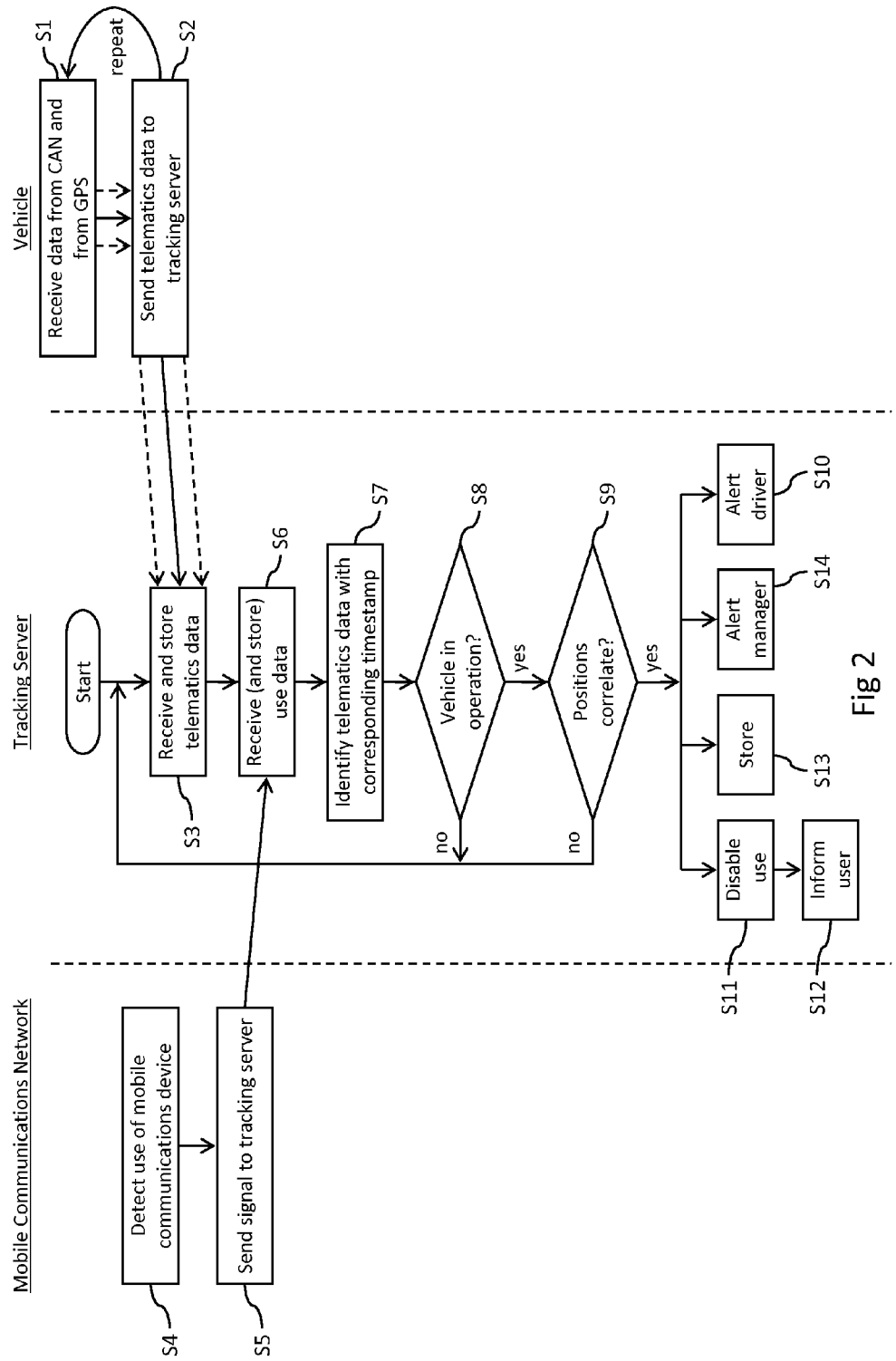
FIG. 2 shows a method for detecting use of a mobile phone while driving in the system of FIG. 1 according to an embodiment of the invention.

In the embodiment described in relation to FIGS. 1 and 2, the location of the mobile communications device is correlated with the location of the vehicle when determining use of the mobile communications device while driving. Other parameters may be used as an alternative to or in addition to location information. For example, the tracking server may correlate the velocities of the mobile communications device and of the vehicle to determine if the mobile communications device is travelling at the same velocity as the vehicle. With reference to FIG. 2, a new or alternative step S9A may include correlating the velocities of the mobile communications device and of the vehicle. If the velocities do not correlate, then the method returns to step S3, if the velocities do correlate, then the method will proceed to one or more of steps S10, S11, S13 and S14.

In both the above embodiments, the alerting of the driver and the blocking have been shown as potentially occurring at the same time. This may not necessarily be the case and the system may be arranged such that the driver is alerted immediately on detection of use while driving. This alert may be provided for a period of time (for example 5, 10 or 20 seconds) and after this period, if the use of the mobile phone while driving is still going on, the use may be disabled. This would give the driver a chance to end the use of the mobile communications device voluntarily.

Equally, the driver may be alerted before a record of the occurrence is stored, so as to again be given the chance to end the use of the mobile communications device voluntarily One method of detecting whether the vehicle is in operation is to determine the position of the ignition switch. In some vehicle there is no ECU on the CAN that will output the appropriate data for this determination. In such cases the telematics unit 12 may deduce the position of the ignition switch. For example, the telematics unit 12 may look for signals from ECUs which are only operational at certain positions of the ignition switch. Alternatively the telematics unit 12 may measure the voltage on the power lines of the vehicle to deduce the position of the ignition switch. Other possibilities will be readily apparent to the skilled person.

This may be equally applicable to other data provided by ECUs. For example the telematics unit 12 may use the speed of the engine and the gear the vehicle is in to calculate the speed of the vehicle, without directly measuring the speed itself.

Two different embodiments of the invention have been described above, however it is conceived that elements of each embodiment may be combined in alternative embodiments of the invention.

For example, some of the functionality of the tracking server 36 in FIG. 1 may be included into the telematics unit 12. In such an embodiment, the message indicating use, whether from a network node, or an application running on the mobile communications device may be sent to the telematics unit 12. Furthermore the telematics unit 12 may be able to process the received messages indicating use of the mobile communications device and the telematics data to determine concurrent use as described in FIG. 2.

The telematics unit of FIG. 3, incorporating the local radio receiver or signal detector, may be included into a tracking system substantially as described in relation to FIG. 1. That is, the telematics unit 12 may report the detected use of the mobile phone to the tracking server 36. The telematics unit 12 may subsequently await instructions (i.e. to jam the signal or to alert the driver) from the tracking server 36. In this embodiment the correlation of location by the tracking server is optional since by detecting use of a mobile communications device in the vehicle, the correlation of location is implied.

Equally, the timer described in relation to FIGS. 3 and 4 may be used in the system of FIGS. 1 and 2. For example, if the tracking server 36 receives notification of use of the mobile communications device for a preset period, then a disable message may be sent.

The radio receiver/signal detector 72 may be arranged to separately report detected use of the mobile communications device to the tracking server 36, that is, using its own wireless unit. The radio receiver/signal detector 72 and transmitter/jammer 74 may be combined into one module, or may be separate devices. One or both of the receiver 72 and transmitter 74 may be provided as an optional add-in module for the telematics unit 12.

The method steps of FIGS. 2 and 4 have been shown in a particular order, however it will be apparent that this does not have to be the case. For example, in the embodiment in FIG. 2, the correlation of position may occur before it is determined whether the vehicle is in operation such that only if the locations correlate are the other steps performed. Equally, the loop T1 may only be performed if the vehicle is in operation, that is, loop T2 may be performed before loop T1.

While steps S10, 11, S13, S14, T7, T8, T9 and T10 in FIGS. 2 and 4 have been described in a particular order above, they may be performed in any order, or concurrently. Equally, each of the steps are optional and therefore only one or more of the steps may be performed.

The telematics unit 12 may be arranged to be responsive to, for example the ignition position of the vehicle, and will only operate if the ignition is on. Consequently the determination of the operation of the vehicle may be implicit, since the vehicle will be assumed to be in operation if the ignition is on, and the ignition is required to be on for the method to run.

The response of the tracking server 36 and/or telematics unit 12 may be adaptive on conditions. That is, the response to a positive determination of use of a mobile communications device by a user while the user is operating a vehicle may change depending on a number of factors.

For example, the fleet manager may operate a policy whereby a first offence (use while driving) is ignored, or whereby only regular offenders have their calls blocked. Consequently, a first positive determination may be logged in a memory, and after subsequent positive determination, the system checks as to whether it was a first offence.

The response to a positive determination may be dependent on, for example, location. The location corresponding to the positive determination may be correlated with known accident black spots, for example schools. In this case a positive determination in such an area may lead to an immediate disabling. Alternatively, a positive determination on e.g. little used roads may only lead to an alert. A similarly adaptive response may be performed with time, that is, if the positive determination is made during rush hour, the use is disabled, whereas a positive determination outside rush hour may only lead to a warning.

The telematics data may also be used to determine the conditions in which the vehicle is being operated, and to provide an adaptive response. For example, if the vehicle is travelling at a steady speed (for example on a main road) the use of the mobile communications device may simply be logged, and/or an alert issued. However if the vehicle is constantly changing speed, as would occur in urban driving, or in busy conditions then the use of the mobile communications device may be disabled, since an accident is increasingly likely in such circumstances.

By using the location of the mobile communications device in relation to such high risk areas, the system may provide differing responses depending on a measure of risk. In other words, in a high risk scenario, the use of the mobile communications device may be disabled, whereas in a low risk scenario the use of the mobile communications device may simply lead to an alert.

Equally, the telematics data and use data may be stored to provide data for historic analysis. This data may be used to identify accident black spots, or areas where the driver is required to provide many inputs to the vehicle. The concurrent use data and telematics data may be used to provide information on potential degradation of the driver's ability when using the mobile communications device. For example, an application may be used to determine if a driver is driving well, that is operating with smooth inputs etc. . . . The use data may then be used to determine if the driver stops driving well while using the mobile communications device.

In FIG. 1, the method continuously checks for use data, however, this may not necessarily be the case. The tracking server 36 may periodically request data, whether stored locally, or requested from the mobile communications network 50, and perform a determination on any and all use data that is received. This may be performed e.g. at the end of a day, or at the end of a month.

The detection of use of a mobile communications device while driving may be performed in real time, or close to real time. However, there may also be delays before the detection is made. This may occur if CDRs as described above are used to detect use of the mobile communications device. In such cases the system may be configured to use the time between the use and the detection to determine a course of action. That is, if more than a preset period of time has passed between use and detection, the system may decide not to provide the alert to the driver.

The GPS is purely an example of a positioning device which may be used by the telematics unit 12. Other navigation systems such as GLASNOSS or LORAN may be used. Alternatively, position information may be derived from cell tower triangulation using the wireless unit 18.

The electronic control units (ECUs) may also be known as Electronic Control Modules (ECMs) or Central Control Modules (CCMs). It will be apparent that the use of ECU is solely exemplary and any such device is intended to be covered by the use in the description.

Equally the Controller Area Network (CAN) is only an example of a vehicle network which may be used. Other types of vehicle network or vehicle bus are a Vehicle Area Network (VAN), FlexRay, Local Interconnect Network (LIN), J1939, and J1850. It will again be apparent that any such vehicle network, able to provide vehicle data, may be used in embodiments of the invention.

The OBD port 10 is only one example of a way in which the telematics unit 12 may be connected to the vehicle network. The individual vehicles may be provided with different types of port, depending on type and make. For example OBD-2 is generally used for cars. Other OBD Ports include OBD-1.5, EOBD (European On Board Diagnostics), EOBD-2 (Enhanced On Board Diagnostics, Second Generation), JOBD (Japanese On Board Diagnostics). It will be apparent that any such port may be used in an embodiment of the invention.

As an alternative to using an OBD port or the like, it is possible that the telematics unit 12 is connected to one or more sensors unconnected to an existing vehicle network(s), this may include a sensor for detecting the motion of the vehicle such as a speed sensor on a drive shaft or axle of the vehicle, or a sensor for detecting operation of the engine, such as a sensor for measuring the voltage provided to the telematics device to determine if the vehicle alternator is operating, and therefore inferring the operation of the vehicle engine. It is also possible for a detector to be attached to the wires of the vehicle network, and to detect signals on the wires (i.e. through magnetic induction) without a physical connection as is provided by the OBD port. In general the systems described above use data from a sensor mounted within the vehicle to detect the operation of the vehicle.

Hard drive 62 of tracking server 36 is only an example of a memory, and any memory (such as a flash memory or a distributed store) may be used. The memory may be located at a location remote from the tracking server, such as a network server. The memory may be distributed over a number of physical entities.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A system for detecting use of a mobile communications device by a user while the user is operating a vehicle, the system comprising:
  a radio receiver configured to receive first data from the mobile communications device, wherein the first data is indicative of use of the mobile communications device at a point in time and is indicative of a first location of the mobile communications device at the point in time and a first location area, the first location area being related to a degree of error of the first location;
  a wireless unit configured to transmit second data to a base station, wherein the second data is indicative of an operative state of the vehicle at the point in time and is indicative of a second location of the vehicle at the point in time and a second location area, the second location area being related to a degree of error of the second location, wherein the radio receiver is configured to switch off to prevent reception of wireless signals while the wireless unit is transmitting signals to the base station so as to avoid false detection of use of the mobile communications device; and a processor configured to perform a process to determine that the mobile communications device was used by the user while the user was operating the vehicle, the process comprising:

determining that the first data is indicative of the mobile communications device being used;

determining that the second data is indicative of the vehicle being operated;

correlating the first data with the second data on the basis of respective location data to determine that the mobile communications device was being used by the user at the same location as where the user was operating the vehicle, wherein correlating the first data with the second data includes determining that the first location area and the second location area overlap;

repeating the step of correlating the first data with the second data to determine that the mobile communications device was used by the user for a period of time while the user was operating the vehicle;

sending an alert to the user; and following a predetermined amount of time after sending the alert to the user, transmitting a localized jamming signal within the vehicle to jam the mobile communications device and mask signals received by the mobile communications device such that after the localized jamming signal is transmitted, the mobile communications device is not able to properly transmit or receive any wireless signals.

2. The system of claim 1 wherein the first data originates from an application running on the mobile communications device, wherein the application running on the mobile communications device is configured to detect at least one operation of the mobile communications device indicative of use of the mobile communications device by a user.

3. The system of claim 2 wherein the system is configured, responsive to a determination that the mobile communications device was used by the user while the user was operating the vehicle, to send a message to the application running on the mobile communications device, the message indicating that the application is to disable at least one operation of the mobile communications device whereby to disable the use of the mobile communications device.

4. The system of claim 1 comprising a memory configured to store data identifying locations with a high risk of accidents, wherein the system is configured to adaptively respond to a determination that the mobile communications device was used by the user while the user was operating the vehicle based on a risk of accident determined from the location of the vehicle and the mobile communications device.

5. The system of claim 1 comprising a memory configured to store the first data and the second data, and wherein the stored first and second data is used in historical analysis whereby to determine locations and/or driving patterns indicative of a higher risk of an accident.

6. The system of claim 1 wherein the second data is indicative of one or more of:
a speed of the vehicle;
a position of an ignition switch of the vehicle;
a position of a brake of the vehicle; and
data indicative of revolutions per minute of an engine of the vehicle.

7. A method for detecting use of a mobile communications device by a user while the user is operating a vehicle, the method comprising:

receiving, by a radio receiver from the mobile communications device, first data indicative of use of the mobile communications device at a point in time and indicative of a first location of the mobile communications device at the point in time and a first location area, the first location area being related to a degree of error of the first location, and transmitting, by a wireless unit to a base station, second data indicative of an operative state of the vehicle at the point in time and indicative of a second location of the vehicle at the point in time and a second location area, the second location area being related to a degree of error of the second location, wherein the radio receiver is configured to switch off to prevent reception of wireless signals while the wireless unit is transmitting signals to the base station so as to avoid false detection of use of the mobile communications device;

determining that the first data is indicative of the mobile communications device being used;

determining that the second data is indicative of the vehicle being operated;

correlating the first data with the second data on the basis of respective location data to determine that the mobile communications device was being used by the user at the same location as where the user was operating the vehicle, wherein correlating the first data with the second data includes determining that the first location area and the second location area overlap;

repeating the step of correlating the first data with the second data to determine that the mobile communications device was used by the user for a period of time while the user was operating the vehicle; thereafter sending an alert to the user; and following a predetermined amount of time after sending the alert to the user, transmitting a localized jamming signal within the vehicle to jam the mobile communications device and mask signals received by the mobile communications device such that after the localized jamming signal is transmitted, the mobile communications device is not able to properly transmit or receive any wireless signals.

8. The method of claim 7 wherein the first data originates from an application running on the mobile communications device, wherein the application running on the mobile communications device is configured to detect at least one operation of the mobile communications device indicative of use of the mobile communications device by a user, wherein the method comprises sending, responsive to a determination that the mobile communications device was used by the user while the user was operating the vehicle, a message to the application running on the mobile communications device, the message indicating that the application is to disable at least one operation of the mobile communications device whereby to disable the use of the mobile communications device.

9. The method of claim 8 comprising sending a notification message to the mobile communications device, the notification message indicating that said use of the mobile communications device was disabled on the basis of a determination that the mobile communications device was used by the user while the user was operating the vehicle.

10. The method of claim 8 comprising sending a notification message to the mobile communications device, the message indicating that said use of the mobile communications device was disabled on the basis of a determination that the mobile communications device was used by the user while the user was operating the vehicle.

11. The method of claim 7 comprising:
storing data identifying locations with a high risk of accidents; and
adaptively responding to a determination that the mobile communications device was used by the user while the user was operating the vehicle based on a risk of accident determined from the location of the vehicle and the mobile communications device.

12. The method of claim 7 comprising:
storing the first data and the second data; and
using the stored first and second data in historical analysis whereby to determine locations and/or driving patterns indicative of a higher risk of an accident.

13. The method of claim 7 comprising sending, responsive to a determination that the mobile communications device was used by the user while the user was operating the vehicle, a signal to an alerting unit within the vehicle whereby to alert the driver of the vehicle.

14. The method of claim 7 comprising:
receiving driver identification data; and
using the driver identification data to associate a mobile communications device with the vehicle whereby to determine that the mobile communications device was used by the user while the user was operating the vehicle.

15. A non-transitory computer readable storage medium storing computer readable instructions thereon for execution on a computing system to implement a method for detecting use of a mobile communications device by a user while the user is operating a vehicle, the method comprising:
receiving, by a radio receiver from the mobile communications device, first data indicative of use of the mobile communications device at a point in time and indicative of a first location of the mobile communications device at the point in time and a first location area, the first location area being related to a degree of error of the first location, and
transmitting, by a wireless unit to a base station, second data indicative of an operative state of the vehicle at the point in time and indicative of a second location of the vehicle at the point in time and a second location area, the second location area being related to a degree of error of the second location, wherein the radio receiver is configured to switch off to prevent reception of wireless signals while the wireless unit is transmitting signals to the base station so as to avoid false detection of use of the mobile communications device;
determining that the first data is indicative of the mobile communications device being used;
determining that the second data is indicative of the vehicle being operated;
correlating the first data with the second data on the basis of respective location data to determine that the mobile communications device was being used by the user at the same location as where the user was operating the vehicle, wherein correlating the first data with the second data includes determining that the first location area and the second location area overlap;
repeating the step of correlating the first data with the second data to determine that the mobile communications device was used by the user for a period of time while the user was operating the vehicle;
sending an alert to the user; and
following a predetermined amount of time after sending the alert to the user, transmitting a localized jamming signal within the vehicle to jam the mobile communications device and mask signals received by the mobile communications device such that after the localized jamming signal is transmitted, the mobile communications device is not able to properly transmit or receive any wireless signals.

* * * * *